(12) United States Patent
Yamazaki et al.

(10) Patent No.: US 11,261,307 B2
(45) Date of Patent: Mar. 1, 2022

(54) LAMINATED FILM

(71) Applicant: TOYOBO CO., LTD., Osaka (JP)

(72) Inventors: Atsushi Yamazaki, Inuyama (JP); Kyoko Inagaki, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 199 days.

(21) Appl. No.: 16/078,993

(22) PCT Filed: Feb. 14, 2017

(86) PCT No.: PCT/JP2017/005267
§ 371 (c)(1),
(2) Date: Aug. 22, 2018

(87) PCT Pub. No.: WO2017/145862
PCT Pub. Date: Aug. 31, 2017

(65) Prior Publication Data
US 2019/0054724 A1    Feb. 21, 2019

(30) Foreign Application Priority Data

Feb. 23, 2016 (JP) .............................. JP2016-032091

(51) Int. Cl.
| | |
|---|---|
| *B32B 9/00* | (2006.01) |
| *B32B 27/36* | (2006.01) |
| *B32B 15/20* | (2006.01) |
| *B32B 27/30* | (2006.01) |
| *B32B 27/40* | (2006.01) |
| *C08J 7/052* | (2020.01) |
| *B65D 65/40* | (2006.01) |
| *C08J 7/04* | (2020.01) |
| *C08J 7/043* | (2020.01) |
| *C08J 7/048* | (2020.01) |

(52) U.S. Cl.
CPC .................. *C08J 7/052* (2020.01); *B32B 9/00* (2013.01); *B32B 15/20* (2013.01); *B32B 27/308* (2013.01); *B32B 27/36* (2013.01); *B32B 27/40* (2013.01); *B65D 65/40* (2013.01); *C08J 7/043* (2020.01); *C08J 7/048* (2020.01); *C08J 7/0423* (2020.01); *B32B 2255/28* (2013.01); *B32B 2305/72* (2013.01); *B32B 2307/416* (2013.01); *B32B 2307/7244* (2013.01); *B32B 2439/70* (2013.01); *C08J 2367/02* (2013.01); *C08J 2433/06* (2013.01); *C08J 2433/20* (2013.01); *C08J 2433/26* (2013.01); *C08J 2475/04* (2013.01)

(58) Field of Classification Search
CPC ....... B32B 27/36; B32B 27/40; B32B 27/308; B32B 9/00; B32B 15/20; B32B 2255/28; B32B 2305/72; B32B 2307/416; B32B 2307/7244; B32B 2439/70; B65D 65/40; C08J 7/052; C08J 7/043; C08J 7/048; C08J 7/0423; C08J 2433/06; C08J 2433/20; C08J 2433/26; C08J 2475/04; C08J 2367/02

See application file for complete search history.

(56) References Cited

U.S. PATENT DOCUMENTS

| | | |
|---|---|---|
| 6,569,533 B1 | 5/2003 | Uchida et al. |
| 2001/0016260 A1 | 8/2001 | Yoshida et al. |
| 2013/0260144 A1 | 10/2013 | Yamazaki et al. |
| 2017/0166718 A1 | 6/2017 | Ozeki et al. |

FOREIGN PATENT DOCUMENTS

| | | |
|---|---|---|
| CN | 103237659 A | 8/2013 |
| EP | 3263336 A1 | 1/2018 |
| JP | H02-050837 A | 2/1990 |
| JP | H11-179836 A | 7/1999 |
| JP | 4524463 B2 | 8/2010 |
| JP | 2013-006283 A | 1/2013 |
| JP | 2014-030984 A | 2/2014 |
| JP | 5560708 B2 | 7/2014 |
| WO | WO 2016/013624 A1 | 1/2016 |

OTHER PUBLICATIONS

Japanese Patent Office, International Search Report in International Patent Application No. PCT/JP2017/005267 (dated May 16, 2017).
European Patent Office, Extended European Search Report in European Patent Application No. 17756302.0 (dated Sep. 18, 2019).
China National Intellectual Property Administration, The First Office Action in Chinese Patent Application No. 201780012833.1 (dated Sep. 2, 2019).
Indonesian Patent Office, Office Action in Indonesian Patent Application No. P00201805914 (dated Jul. 27, 2020).
Brazilian Patent Office, Preliminary Office Action in Brazilian Patent Application No. BR112018015714-7 (dated Jun. 8, 2021).

*Primary Examiner* — Catherine A. Simone
(74) *Attorney, Agent, or Firm* — Leydig, Voit & Mayer, Ltd.

(57) ABSTRACT

The invention provides a laminated film. The laminated film includes a polyester substrate film, and a coating layer on/over at least one surface of the substrate film. The coating layer includes a resin composition including a resin having an oxazoline group. The laminated film has an inorganic thin-film layer on/over the coating layer, and a protective layer that has a urethane resin and has an adhesion amount of 0.15 to 0.60 g/m² on/over the inorganic thin-film layer. The laminated film shows a total reflection infrared absorption spectrum having a ratio P1/P2 ranging from 1.5 to 3.5 wherein P1 is the intensity of a peak having an absorption maximum in a range of 1530±10 cm$^{-1}$, and P2 is that in a range of 1410±10 cm$^{-1}$. The laminated film further has an oxygen permeability of 5 ml/m²·d·MPa or less under conditions of 23° C.×65% RH.

10 Claims, No Drawings

LAMINATED FILM

CROSS-REFERENCE TO RELATED APPLICATIONS

This patent application is the U.S. national phase of International Patent Application No. PCT/JP2017/005267, filed Feb. 14, 2017, which claims the benefit of Japanese Patent Application No. 2016-032091, filed on Feb. 23, 2016, which are incorporated by reference in their entireties herein.

TECHNICAL FIELD

The present invention relates to a laminated film used in a packaging field for foods, medicines, industrial products and others. The invention relates particularly to a laminated film which can attain the following when the film is rendered a gas barrier laminated film having an inorganic thin-film layer: the laminated film makes the inorganic thin-film layer in interlayer adhesion, and can express a good gas barrier performance, adhesion and flexing resistance.

BACKGROUND ART

Packaging materials used for foods, medicines and others are required to have a property of blocking gases such as oxygen and water vapor, that is, a gas barrier performance to restrain proteins, and fats and oils from being oxidized, keep taste and freshness, and maintain efficacies of the medicines. Gas barrier materials used in electronic devices or electronic parts, such as solar batteries and organic ELs, are required to have a higher gas barrier performance than the packaging materials for foods and others.

In the use of food which is required to block various gases, such as water vapor and oxygen, in general, a gas barrier laminated body has been hitherto used which has a substrate film made of a plastic material, and a metallic thin film or inorganic thin film on a surface of the substrate film, the former thin film being made of, for example, aluminum, or the latter thin film being made of an inorganic oxides such as silicon oxide or aluminum oxide. Out of such laminated bodies, a laminated body has widely been used in which a thin film of an inorganic oxide made of, for example, silicon oxide, aluminum oxide or a mixture of these oxides (inorganic thin-film layer) is formed since the laminated body is transparent to allow to check a content in the laminated body.

However, this gas barrier laminated body has a problem that the inorganic thin-film layer is physically damaged by flexing-load in a step of post-processing the laminated body, such as a printing, laminating or bag-manufacturing step, and in a laminated-body transporting/circulating step, so that the laminated body is deteriorated in gas barrier performance. When the inorganic thin-film layer is once damaged in the processing step, it is feared that the laminated body is largely damaged in gas barrier performance by undergoing a subsequent heat-moisture treatment such as boiling/retorting treatment. Moreover, a film in which interlayer adhesion is poor between a vapor-deposited layer and a resin contacting this layer undergoes exfoliation by flexing-load. Consequently, problems are caused that the film is deteriorated in barrier performance, and a content therein leaks out.

Against the problems, as a method for improving a deterioration of a gas barrier laminated body in which an inorganic thin-film layer is formed, the following method has been suggested: a method of locating a coating layer made of an aqueous polyurethane resin or a polyester resin that may be of various types, or a mixture of a polyurethane and a polyester (for example, Patent Document 1) between a polyester substrate film and an inorganic thin-film layer formed by, for example, vapor deposition. Furthermore, a report has been made about a technique of laying a coating layer made of an oxazoline-group-containing water-soluble polymer to improve the coating layer in water resistance under a heat-moisture condition (see, for example, Patent Document 2). The laying of the coating layer between the substrate film and the inorganic thin film can be continuously performed while a film of the substrate is formed. Thus, it can be expected that the laying makes costs far lower than the formation of a protective layer on the inorganic thin film. However, in this structure, the resultant laminated body is not sufficient in gas barrier performance since the coating itself has no gas barrier performance so that only the inorganic thin-film layer contributes mainly to the gas barrier performance of the laminated body. Thus, this structure has a problem that the laminated body is not sufficient in gas barrier performance.

Against this problem, an attempt has been made in which a protective layer having gas barrier performance is further laid on the above-mentioned inorganic thin film. Suggested has been, for example, a method of coating the upper of an inorganic film with a water-soluble polymer, an inorganic lamellar compound, and a metal alkoxide or hydrolyzate thereof, and then using a sol-gel method to produce, on the inorganic thin film, a complex of an inorganic substance containing the inorganic lamellar compound, and the water-soluble polymer. According to this method, the resultant laminated body shows excellent properties also after subjected to a heat-moisture treatment. However, the liquid supplied for the coating is low in stability to cause the following problems: the laminated body is varied in properties between the starting time of the coating and the ending time thereof (for example, when the laminated body is made into a roll film to be industrially circulated, the laminated body is varied therein between an outer circumferential portion of the roll and an inner circumferential portion); the film is varied in properties in the width direction thereof by a slight difference in drying- or thermal-treatment-temperature of the film in this direction; and such films are largely varied in quality in accordance with the environment at the producing time of the films. Furthermore, the film obtained by the coating by the sol-gel method is poor in flexibility. Thus, it is pointed out as a problem that when the film is flexed or impacted, pinholes or defects are easily generated to lower the film in gas barrier performance.

Under such a situation, in a coating method without using any sol-gel method or the like, that is, in a coating method in which a resin is mainly used and at the time of coating with the resin a crosslinking reaction is involved in the coating, it is desired to make an improvement capable of forming a layer of the resin on an inorganic thin-film layer. Examples of a gas barrier laminated body in which such an improvement is made include a gas barrier laminated body in which the upper of an inorganic thin film is coated with a resin layer containing an inorganic lamellar compound of a specific particle size and aspect ratio; a gas barrier laminated body in which the upper of an inorganic thin film is coated with a barrier resin containing a silane coupling agent; and a laminated body in which the upper of an inorganic thin film is coated with a m-xylylene-group-containing polyurethane (see, for example, Patent Document 3).

However, in the current circumstance, the above-mentioned methods are each incapable of yielding a gas barrier film which is excellent in production stability and economy when produced, which can maintain a good barrier performance and adhesion also after subjected to a severe heat-moisture treatment, and which also has an appropriate flexing resistance.

PRIOR ART DOCUMENTS

Patent Document

Patent Document 1: JP-A-02-50837
Patent Document 2: Japanese Patent No. 5560708
Patent Document 3: Japanese Patent No. 4524463
Patent Document 4: JP-A-11-179836

SUMMARY OF THE INVENTION

Problems to be Solved by the Invention

Patent Document 2 described above aims particularly to maintain the retort barrier performance of the laminated film; thus, no investigations are made about an improvement thereof in gas barrier performance before a treatment is applied to the laminated body. About Patent Document 3, an investigation is made about the temperature dependency of the oxygen permeability of the laminated body. These properties each show a good value. However, investigations are not made about the gas barrier performance or adhesion, nor the flexing resistance of the laminated film after a severe heat-moisture treatment, such as retort/boiling.

In light of such problems in the prior art, the present invention has been made. An object thereof is to provide a laminated film which has the following advantages when the film is rendered a gas barrier laminated film having an inorganic thin-film layer: in the state that the film is kept in an ordinary state, and also after the film is subjected to a heat-moisture treatment, the laminated film is excellent in oxygen gas barrier performance and in adhesion between its layers; has an appropriate flexing resistance; is easily produced; and is also excellent in economy.

Means for Solving the Problems

The present inventors have found out that: a laminated film is formed to have a structure in which an inorganic thin-film layer is sandwiched between a specific coating layer and a specific barrier protective layer that are each excellent in flexibility and adhesion; and this structure allows to improve the laminated film in gas barrier performance before a treatment is applied thereto, and to maintain the barrier performance, and adhesion also after the film is subjected to a severe heat-moisture treatment. Thus, the present invention has been accomplished.

Accordingly, the present invention has an aspect or embodiments as described below.

(1) A laminated film, comprising a polyester substrate film, and a coating layer on/over at least one surface of the polyester substrate film; the layer comprising a resin composition for coating layer, comprising, as a constituent component, a resin having an oxazoline group; the laminated film having an inorganic thin-film layer on/over the coating layer, and further having a protective layer that has a urethane resin and has an adhesion amount of 0.15 to 0.60 g/m$^2$ on/over the inorganic thin-film layer; the laminated film showing a total reflection infrared absorption spectrum having a ratio P1/P2 ranging from 1.5 to 3.5 wherein P1 is an intensity of a peak having an absorption maximum in a range of 1530±10 cm$^{-1}$, and P2 is an intensity of a peak having an absorption maximum in a range of 1410±10 cm$^{-1}$; and further the laminated film having an oxygen permeability of 5 ml/m$^2$·d·MPa or less under conditions of a temperature of 23° C. and a relative humidity of 65%.

(2) The laminated film according to item (1), wherein the urethane resin comprised in the protective layer comprises an aromatic or aromatic-aliphatic component.

(3) The laminated film according to item (1) or (2), wherein the urethane resin comprised in the protective layer comprises a m-xylylene component.

(4) The laminated film according to any one of items (1) to (3), wherein the oxazoline-group-containing resin in the resin composition for coating layer, contains an oxazoline group amount of 5.1 to 9.0 mmol/g.

(5) The laminated film according to any one of items (1) to (4), wherein the coating layer comprises therein an acrylic resin having an acid value of 10 mgKOH/g or less.

(6) The laminated film according to any one of items (1) to (5), wherein the inorganic thin-film layer is an layer of a complex oxide of silicon oxide and aluminum oxide.

Effect of the Invention

The present invention allows to provide a laminated film which has the following advantages when this film is rendered a gas barrier laminated film having an inorganic thin-film layer: of course in the state that the film is kept in an ordinary state, or also after the film is subjected to a severe heat-moisture treatment such as retorting treatment, the laminated film exhibits an excellent gas barrier performance, and expresses a good laminating strength (adhesion) that does not generate any delamination. Additionally, the number of working-steps for the laminated film of the present invention is small, and thus the laminated film can easily be produced; it is therefore possible to provide a gas barrier film which is excellent in both of economy and production stability, and has homogeneous properties.

MODE FOR CARRYING OUT THE INVENTION

The laminated film of the present invention is a film having a polyester substrate film; and a coating layer, an inorganic thin-film layer, and a protective layer on/over at least one surface of this substrate film. Initially, a description will be made about the polyester substrate film. Next, a description will be made about the coating layer, the inorganic thin-film layer and other layers that are each laminated on/over this substrate film.

[Polyester Substrate Film]

The polyester substrate film (hereinafter referred to also as the "substrate film") used in the present invention may be, for example, a film yielded by melt-extruding a polyester, optionally drawing the extruded film in the longitudinal direction and/or width direction thereof, and then cooling and thermally fixing the film. The polyester is preferably, for example, polyethylene terephthalate, polybutylene terephthalate, polyethylene-2,6-naphthalate from the viewpoint of heat resistance, dimension stability and transparency, and particularly preferably, polyethylene terephthalate, or a copolymer yielded by copolymerizing polyethylene terephthalate and some other component.

The substrate film may be a substrate film having any film thickness in accordance with desired mechanical strength, transparency and other purposes thereof, and the usage thereof. The film thickness is not particularly limited. The film thickness is usually recommended to be from 5 to 250 μm. When the substrate film is used as a packaging material, the thickness is desirably from 10 to 60 μm.

The transparency of the substrate film is not particularly limited. When the substrate film is used as a packaging material for which transparency is required, the film desirably has a light ray transmittance of 50% or more.

The substrate film may be a monolayered film made of a single polyester species, or a laminated film in which two or more polyester films are laminated onto each other. When the substrate film is rendered a laminated film, for example, the species of the laminated body, the number of the laminated layers, and the laminating method are not particularly limited. These may be selected at will from known methods in accordance with a purpose of the film.

As far as the objects of the present invention are not damaged, the substrate film may be subjected to a surface treatment such as corona discharge treatment, glow discharge, flame treatment, or a surface-roughening treatment. Moreover, the substrate film may be subjected to, for example, a known anchor coat treatment, printing or decoration.

[Coating Layer]

The coating layer in the present invention includes a resin having an oxazoline group. It is particularly preferred that in the coating layer, unreacted ones out of their oxazoline groups are present. Oxazoline groups are high in affinity with an inorganic thin film, such as a metal oxide. Moreover, when the inorganic thin-film layer is formed, the groups react with oxygen-deficient moieties of a generated inorganic oxide, or a metal hydroxide, so that the oxazoline groups show a strong adhesion to the inorganic thin-film layer. Additionally, the unreacted oxazoline groups present in the coating layer react with the substrate film and with a terminal of a carboxylic acid generated by the hydrolysis of the coating layer, so that the groups form crosslinkage. Consequently, the coating layer can keep water resistance.

By causing the unreacted oxazoline group moieties and the reacted crosslinked moieties to coexist in the coating layer, the coating layer becomes a film having both of water resistance and flexibility. For this reason, when flexing-load or the like is applied thereto, stress to the inorganic thin-film layer can be relieved so that this layer can be restrained from being lowered in gas barrier performance.

Also the coating layer made only of a resin having an oxazoline group can express heat-moisture treatment resistance. However, when the coating layer is subjected to a longer-period and higher-temperature severe heat-moisture treatment, the inorganic thin-film layer may not be avoided from being damaged by a deformation of the coating layer itself since the coating layer itself is somewhat insufficient in cohesive force. Thus, in the present invention, it is preferred that the coating layer further includes an acrylic resin in order that the coating layer can sufficiently ensure a severer heat-moisture treatment. The inclusion of the acrylic resin makes an improvement of the coating layer itself in cohesive force followed by water resistance.

When a urethane resin, particularly, a urethane resin having a carboxylate group is further blended into the resin composition for coating layer in the present invention, the resultant coating layer can be made higher in heat-moisture treatment resistance. In other words, when the carboxylic group in the urethane resin is caused to react with the oxazoline group, the coating layer becomes a layer having the flexibility of the urethane resin while partially crosslinked. Thus, stress relief of the inorganic thin-film can be attained at a higher level.

Although the laminated film of the present invention is a laminated body having the inorganic thin-film layer, the laying of the coating layer allows that the inorganic thin-film layer maintains gas barrier performance and interlayer adhesion and simultaneously the laminated film has an appropriate flexing resistance according to the above-mentioned embodiment even after the laminated film is subjected to a heat-moisture treatment such as retorting.

The following will describe, in detail, constituent components of the resin composition for coating layer, which forms the coating layer.

(Resin (A) Having Oxazoline Group)

The coating layer in the present invention contains a resin having an oxazoline group. This oxazoline-group-having resin is, for example, a polymer having an oxazoline group that is yielded by copolymerizing a polymerizable unsaturated monomer having an oxazoline group and an optional different polymerizable unsaturated monomer by a method known in the prior art (for example, solution polymerization or emulsion polymerization).

Examples of the polymerizable unsaturated monomer having an oxazoline group include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline. These monomers may be used alone or in combination of two or more thereof.

Examples of the different polymerizable unsaturated monomer include methyl (meth)acrylate, ethyl (meth)acrylate, propyl (meth)acrylate, butyl (meth)acrylate, 2-ethylhexyl (meth)acrylate, cyclohexyl (meth)acrylate, lauryl (meth)acrylate, isobornyl (meth)acrylate, and other alkyl or cycloalkyl esters of (meth)acrylic acid that each have 1 to 24 carbon atoms; 2-hydroxyethyl (meth)acrylate, hydroxypropyl (meth)acrylate, and other hydroxyalkyl esters of (meth) acrylic acid that each have 2 to 8 carbon atoms; styrene, vinyltoluene, and other vinyl aromatic compounds; (meth) acrylamide, dimethylaminopropyl (meth)acrylamide, dimethylaminoethyl (meth)acrylate, any adduct of glycidyl (meth)acrylate and an amine; polyethylene glycol (meth) acrylate; and N-vinylpyrrolidone, ethylene, butadiene, chloroprene, vinyl propionate, vinyl acetate, and (meth)acrylonitrile. These may be used alone or in combination of two or more thereof.

The oxazoline-group-having resin used in the present invention is preferably a water-dispersible resin from the viewpoint of improvements of the resin in compatibility with other resins and wettability and in crosslinking reaction efficiency, an improvement of the coating layer in transparency, and others. In order to render this oxazoline-group-having resin a water-dispersible resin, it is preferred to incorporate a hydrophilic monomer, as the different polymerizable unsaturated monomer, into the resin-starting monomers.

Examples of the hydrophilic monomer include 2-hydroxyethyl (meth)acrylate, methoxy polyethylene glycol (meth)acrylate, monomers each having a polyethylene glycol chain, such as a monoester compound made from (meth)acrylic acid and polyethylene glycol, 2-aminoethyl (meth)acrylate and salts thereof, (meth)acrylamide, N-methylol (meth)acrylamide, N-(2-hydroxyethyl) (meth)acrylamide, (meth)acrylonitrile, and sodium styrenesulfonate. Out of such monomers, preferred is a monomer having a polyethylene glycol chain, such as a monoester compound made from (meth)acrylic acid and polyethylene glycol (the molecular weight of the introduced polyethylene glycol chain is preferably from 150 to 700, and is from 150 to 200, particularly, from the viewpoint of the water resistance of the laminated film, or is preferably from 300 to 700 from the viewpoint of the compatibility of the monomer with other resins, and the transparency of the coating layer).

In the copolymer made from the polymerizable unsaturated monomer having an oxazoline group and the different polymerizable unsaturated monomer, the composition proportion by mole of this oxazoline-group-having polymerizable unsaturated monomer is preferably from 30 to 70% by mole, more preferably from 40 to 65% by mole.

In the oxazoline-group-having resin, the oxazoline group content is preferably from 5.1 to 9.0 mmol/g, more preferably from 6.0 to 8.0 mmol/g. In the prior art, about the use of a resin having an oxazoline group in a coating layer, the following example has been reported; an example in which a resin having an oxazoline group content of about 5.0 mmol/g is used (see, for example, Patent Document 4). In the present invention, however, a resin having a relatively large oxazoline group amount is used. This is because the use of the resin having a large oxazoline group amount allows to form a crosslinked structure in the coating layer and simultaneously cause some of the oxazoline groups to remain in the coating layer. As a result, this matter contributes to the maintenance of the gas barrier performance of the laminated film, and an improvement thereof in flexing resistance when the film is subjected to heat-moisture treatment. Such oxazoline-group-containing resins are commercially available as "EPOCROS (registered trademark)" series from Nippon Shokubai America Industries, Inc.

The content proportion of the oxazoline-group-having resin in the entire resin components in the resin composition for coating layer is preferably from 20 to 60% by mass, more preferably from 25 to 55% by mass, even more preferably from 30 to 50% by mass of the entire resins, the proportion thereof being 100% by mass. If the content proportion of the oxazoline-group-having resin is less than 20% by mass, the adhesion water-resistance based on the oxazoline group tends not to be sufficiently exhibited. In the meantime, if the proportion is more than 60% by mass, the proportion of the unreacted oxazoline groups is so large that the coating layer becomes insufficient in cohesive force. Thus, the laminated film is unfavorably lowered in water resistance.

(Acrylic Resin (B))

An acrylic resin may be incorporated into the resin composition for coating layer to improve the coating layer in water resistance and solvent resistance. The acrylic resin may be an acrylic resin for which an alkyl acrylate and/or an alkyl methacrylate (hereinafter these monomers may be together referred to as an "alkyl (meth)acrylate") is/are used as a main component or main components. A specific example of the acrylic resin is a water-soluble or water-dispersible resin which usually contains an alkyl (meth)acrylate in a content proportion from 40 to 95% by mole, and optionally contains a copolymerizable vinyl monomer component having a functional group in a content proportion usually from 5 to 60% by mole. When the content proportion of the alkyl (meth)acrylate in the acrylic resin is set to 40% or more by mole, the resin composition becomes good, particularly, in paintability, and in strength and blocking resistance of the resultant painted film. In the meantime, when the content proportion of the alkyl (meth)acrylate is set to 95% or less by mole and a compound having a specific functional group is introduced, as a copolymerizable component, into the acrylic resin to give a proportion of 5% or more by mole, the acrylic resin can easily be made water-soluble or water-dispersible and further this state can be stabilized over a long term to result in improvements of adhesion between the coating layer and the substrate film, and the strength, water resistance, solvent resistance and others of the coating layer, these properties being based on reaction inside the coating layer. The content proportion of the alkyl (meth)acrylate ranges preferably from 50 to 90% by mole, more preferably from 60 to 85% by mole.

The alkyl group in the alkyl (meth) acrylate is, for example, a methyl, n-propyl, isopropyl, n-butyl, isobutyl, 2-ethylhexyl, lauryl, stearyl, or cyclohexyl group.

Examples of the functional group in the copolymerizable vinyl monomer having a functional group include a carboxyl group, an acid anhydride group, a sulfonate group or salts thereof, an amide group or an alkylolated amide group, an amino group (examples thereof including substituted amino groups), an alkylolated amino group or salts thereof, a hydroxyl group, and an epoxy group. Particularly preferred are carboxyl, acid anhydride, and epoxy groups. Only one, or two or more of these functional groups may be present.

Examples of the compound having a carboxyl group or an acid anhydride group, which is usable as the vinyl monomer, include acrylic acid, methacrylic acid, itaconic acid, and maleic acid; alkali metal salts, alkaline earth metal salts, and ammonium salts of these acids; and further includes maleic anhydride.

Examples of the compound having a sulfonate group or a salt thereof, which is usable as the vinyl monomer, include vinylsulfonic acid, styrenesulfonic acid, and metal (such as sodium) salts and ammonium salts of these sulfonic acids.

Examples of the compound having an amide group or an alkylolated amide group, which is usable as the vinyl monomer, include acrylamide, methacrylamide, N-methylmethacrylamide, methylolated acrylamide, methylolated methacrylamide, ureido vinyl ether, β-ureidoisobutyl vinyl ether, and ureidoethyl acrylate.

Examples of the compound having an amino group, an alkylolated amino group or a salt thereof, which is usable as the vinyl monomer, include diethylaminoethyl vinyl ether, 2-aminoethyl vinyl ether, 3-aminopropyl vinyl ether, 2-aminobutyl vinyl ether, dimethylaminoethyl methacrylate, and dimethylaminoethyl vinyl ether; compounds each yielded by methylolating an amino group of any one of these compounds; and compounds each yielded by making the amino group quaternary by effect of, for example, an alkyl halide, dimethyl sulfate or sultone.

Examples of the compound having a hydroxyl group, which is usable as the vinyl monomer, include β-hydroxyethyl acrylate, β-hydroxyethyl methacrylate, β-hydroxypropyl acrylate, β-hydroxypropyl methacrylate, β-hydroxy vinyl ether, 5-hydroxypentyl vinyl ether, 6-hydroxyhexyl vinyl ether, polyethylene glycol monoacrylate, polyethylene glycol monomethacrylate, polypropylene glycol monoacrylate, and polypropylene glycol monomethacrylate.

Examples of the compound having an epoxy group, which is usable as the vinyl monomer, include glycidyl acrylate, and glycidyl methacrylate.

Besides the compound having any one of the above-mentioned functional groups as the alkyl (meth)acrylate or the vinyl monomer, for example, the following may be incorporated, together with the compound, into the aqueous acrylic resin: acrylonitrile, any styrene compound, butyl vinyl ether, any mono- or dialkyl ester of maleic acid, any mono- or dialkyl ester of fumaric acid, any mono- or dialkyl ester of itaconic acid, methyl vinyl ketone, vinyl chloride, vinylidene chloride, vinyl acetate, vinylpyridine, vinylpyrrolidone, or vinyltrimethoxysilane.

The acrylic resin preferably has a carboxyl group and has an acid value of 10 mgKOH/g or less. The acid value is more preferably 8 mgKOH/g, even more preferably 5 mgKOH/g or less. When the acid value is 10 mgKOH/g or less, the resin itself is excellent in water resistance. Consequently, the coating layer can be improved in cohesive force even when not crosslinked. If the acid value is more than 10 mgKOH/g, the coating layer is crosslinked to be improved in strength, but is lowered in flexibility so that stress to the inorganic thin-film layer may be unfavorably increased when the laminated film is subjected to retorting treatment.

In the resin composition for coating layer, which constitutes the coating layer, the content proportion of the acrylic resin in the entire resins (for example, the whole of the oxazoline-group-having resin, the acrylic resin, and a urethane resin that will be described later) in the composition is preferably from 10 to 60%, more preferably from 15 to 55%, even more preferably from 20 to 50% by mass of the entire resin, the proportion thereof being 100% by mass. If the content proportion of the acrylic resin is less than 10% by mass, the water-resistance-improving and solvent-resistance-improving effects may not be sufficiently exhibited. In the meantime, if the proportion is more than 60% by mass, the coating layer becomes too hard so that stress load onto the inorganic thin-film layer tends to be increased when the laminated film is subjected to heat-moisture treatment.

(Urethane Resin (C))

The resin composition constituting the coating layer preferably contains a urethane resin.

The urethane resin is, for example, a water-soluble or water-dispersible resin yielded by causing a polyhydroxy compound (polyol component) and a polyisocyanate compound to react with each other in a usual way. The aqueous polyurethane resin is preferably a resin containing a carboxyl group or a salt thereof since this resin is made high in affinity, particularly, with a water medium. These constituent components of the urethane resin can be specified by, for example, nuclear magnetic resonance analysis.

Examples of the polyhydroxy compound, which is a constituent component of the urethane resin, include polyethylene glycol, polypropylene glycol, polyethylene/propylene glycol, polytetramethylene glycol, hexamethylene glycol, tetramethylene glycol, 1,5-pentanediol, diethylene glycol, triethylene glycol, neopentyl glycol, polycaprolactone, polyhexamethylene adipate, polyhexamethylene sebacate, polytetramethylene adipate, polytetramethylene sebacate, trimethylolpropane, trimethylolethane, pentaerythritol, and glycerin.

The polyisocyanate compound, which is a constituent component of the urethane resin, include toluylene diisocyanate (2,4- or 2,6-tolylene diisocyanate, or a mixtures thereof) (TDI), diphenylmethane diisocyanate (4,4'-, 2,4'- or 2,2'-diphenylmethane diisocyanate, or a mixtures thereof) (MDI), and other aromatic diisocyanates; xylylene diisocyanate (XDI), and other aromatic-aliphatic diisocyanates; isophorone diisocyanate (IPDI), 4,4-dicyclohexylmethane diisocyanate, 1,3-bis(isocyanatomethyl)cyclohexane, and other cycloaliphatic diisocyanates; 1,6-hexamethylene diisocyanate (HDI), 2,2,4-trimethylhexamethylene diisocyanate, and other aliphatic diisocyanates; and other polyisocyanates obtained by adding one or more of these compounds in advance to, for example, trimethylolpropane.

In order to introduce a carboxyl group or a salt thereof to a urethane resin, it is advisable to use, as a polyol component (polyhydroxy compound), for example, a polyol compound having a carboxyl group such as dimethylolpropionic acid or diethylolbutanoic acid, introduce this compound thereinto as a copolymerizable component, and then neutralize the system with a salt-forming agent. Specific examples of the salt-forming agent include ammonia, trimethylamine, triethylamine, triisopropylamine, tri-n-propylamine, tri-n-butylamine, and other trialkylamines; N-methylmorpholine, N-ethylmorpholine, and other alkyl morpholines; and N-dimethylethanolamine, N-diethylethanolamine, and other N-dialkylalkanolamines. These compounds may be used alone or in combination of two or more thereof.

The urethane resin preferably has a carboxyl group and has an acid value from 10 to 40 mgKOH/g. This resin causes the above-mentioned oxazoline group to react with the carboxyl group so that the coating layer can maintain flexibility while partially crosslinked to attain compatibility between a further improvement in the cohesive force, and stress relief of the inorganic thin-film. The acid value ranges more preferably from 15 to 35 mgKOH/g, even more preferably from 20 to 30 mgKOH/g.

In the resin composition constituting the coating layer when the coating layer contains the urethane resin, the content proportion of the urethane resin in the entire resins (for example, the whole of the oxazoline-group-having resin, the acrylic resin, and the urethane resin, which will be detailed later) in the resin composition is preferably from 10 to 60%, more preferably from 15 to 55%, even more preferably from 20 to 50% by mass of the entire resins, the proportion thereof being 100% by mass. By incorporating the urethane resin into the composition in a proportion in these ranges, the coating layer can be expected to be improved in water resistance.

In the resin composition for coating layer, the ratio of the carboxyl group amount [mmol] to the oxazoline group amount [mmol] in the composition is preferably 20% or less by mmol, more preferably 15% or less by mmol. If the carboxyl group amount is more than 20% by mmol, crosslinking reaction advances excessively when the coating layer is formed. Thus, a large oxazoline group amount is unfavorably consumed. Consequently, the coating layer is lowered in adhesion to the inorganic thin-film layer and in flexibility of the coating layer so that the laminated film may be unfavorably damaged in gas barrier performance and adhesion after subjected to heat-moisture treatment.

In the present invention, the adhesion amount of the coating layer is preferably set into the range of 0.010 to 0.200 g/m². This case allows to control the coating layer evenly so that the inorganic thin-film layer can be densely deposited thereon. Moreover, the coating layer itself is improved in cohesive force to heighten adhesion between any two of the inorganic thin-film layer-the coating layer-the substrate film, so that the coating layer can also be heightened in water resistance. The adhesion amount of the coating layer is preferably 0.015 g/m² or more, more preferably 0.020 g/m² or more, even more preferably 0.025 g/m² or more, and is preferably 0.190 g/m² or less, more preferably 0.180 g/m² or less, even more preferably 0.170 g/m² or less. If the adhesion of the coating layer is more than 0.200 g/m², the inside of the coating layer becomes insufficient in cohesive force, and further the coating layer is also lowered in evenness so that defects are generated in the inorganic thin-film layer. Thus, the laminated film may not sufficiently express gas barrier performance before and after subjected to heat-moisture treatment. Furthermore, production costs are increased to give an economic disadvantage in addition to the decline in the gas barrier performance. In the meantime, if the film thickness of the coating layer is less than 0.010 g/m², the laminated film may not unfavorably gain a sufficient gas barrier performance nor interlayer adhesion.

As far as the present invention is not damaged, various known inorganic or organic additives may be optionally incorporated into the resin composition for coating layer, examples of the additives including an antistatic agent, a lubricant, and an anti-blocking agent.

The method for forming the coating layer is not particularly limited, and may be a method known in the prior art, for example, a coating method. A preferred method, out of coating methods, is an off-line coating method or an in-line coating method. In the case of, for example, an in-line coating method performed in a process of producing the substrate film, drying and thermal treatment conditions in the coating depend on the thickness of the resultant coat, and conditions for the machine. Preferably, immediately after the coating, the workpiece is sent, in a direction perpendicular to the coating direction, into a drawing step, and the workpiece is dried in a pre-heating zone or drawing zone in the drawing step. In such a case, the temperature is usually set into a range preferably from about 50 to 250° C.

[Inorganic Thin-Film Layer]

The laminated film of the present invention has an inorganic thin-film layer on/over the coating layer.

The inorganic thin-film layer is a thin film including a metal or inorganic oxide. A material that forms the inorganic thin-film layer is not particularly limited as far as the material is a material that can be made into a thin film. From the viewpoint of gas barrier performance, the material is preferably an inorganic oxide, such as silicon oxide (silica), aluminum oxide (alumina), or a mixture of silicon oxide and aluminum oxide. Particularly preferred is a complex oxide of silicon oxide and aluminum oxide since the oxide allows to make the thin-film layer compatible between flexibility and denseness. About the blend ratio between silicon oxide and aluminum oxide in this complex oxide, the metal proportion by mass of Al ranges preferably from 20 to 70%. If the Al concentration is less than 20%, the inorganic thin-film layer may be lowered in water vapor barrier performance. In the meantime, if the concentration is more than 70%, the inorganic thin-film layer tends to be hardened, so that the film is broken in a secondary processing, such as printing or laminating, to be unfavorably lowered in barrier performance. Silicon oxide referred to herein is a silicon oxide that may be of various types, such as SiO or $SiO_2$, or any mixture of such oxides, and aluminum oxide referred to herein is an aluminum oxide that may be of various types, such as AlO or $Al_2O_3$, or any mixture of such oxides.

The film thickness of the inorganic thin-film layer is usually from 1 to 100 nm, preferably from 5 to 50 nm. If the film thickness of the inorganic thin-film layer is less than 1 nm, the layer may not easily gain a satisfactory gas barrier performance. In the meantime, if the film thickness is set to more than 100 nm to be made excessively large, a gas-barrier-performance-improving effect corresponding to the thickness is not gained to give disadvantages conversely from the viewpoint of flexing resistance and production costs.

The method for forming the inorganic thin-film layer is not particularly limited. A known vapor deposition method may be appropriately adopted, examples thereof including physical vapor deposition methods (PVD method) such as vacuum vapor deposition, sputtering and ion plating methods, and a chemical vapor deposition method (CVD method). The following will describe a typical method for forming the inorganic thin-film layer, giving a silicon-oxide/aluminum-oxide based thin film as an example. In the case of adopting, for example, a vacuum vapor deposition method, it is preferred to use, as a vapor deposition raw material, for example, a mixture of $SiO_2$ and $Al_2O_3$, or a mixture of $SiO_2$ and Al. As the vapor deposition raw material, particles are usually used. At this time, the size of the individual particles is desirably a size that does not permit the pressure at the time of the vapor deposition to be changed. The particle size is preferably from 1 to 5 mm. For heating the particles, for example, the following manner may be adopted: resistance heating, high frequency induction heating, electron beam heating or laser heating. As a reactive gas, oxygen, nitrogen, hydrogen, argon, carbon dioxide gas, or water vapor may be introduced into the reaction system. Reactive vapor deposition using ozone addition, ion assist or some other means may also be adopted. Furthermore, any change may be applied also to film-forming conditions, for example, bias is applied to a body which vapor deposition is to be applied (a laminated film to be supplied for vapor deposition), or this body is heated or cooled. Also in the case of adopting a sputtering or CVD method, change may be made about, for example, such a vapor deposition raw material, a reactive gas, bias to a body which vapor deposition is to be applied, and/or heating/cooling.

[Protective Layer]

In the present invention, the laminated film has a protective layer on/over the inorganic thin-film layer. The metal oxide layer is not completely a dense film, and has dotted microscopic deficient moieties. By applying, onto the metal oxide layer, a specific resin composition for protecting layer, that will be described later to form the protecting layer, a resin in the resin composition for protecting layer invades the deficient moieties of the metal oxide layer to produce an advantageous effect of stabilizing the gas barrier performance of the laminated layer. Additionally, by using a material having gas barrier performance in the protecting layer itself, the laminated film is also largely improved in gas barrier performance.

The present invention needs to include a urethane resin causing the following to be satisfied: in a total reflection infrared absorption spectrum obtained by measuring the laminated film from the protective layer surface side thereof, the ratio P1/P2 ranges from 1.5 to 3.5 wherein P1 is the intensity of a peak having an absorption maximum in a range of $1530\pm10$ cm$^{-1}$, and P2 is the intensity of a peak having an absorption maximum in a range of $1410\pm10$ cm$^{-1}$. The ratio ranges preferably from 1.7 to 3.2, more preferably from 2.0 to 3.5. The peak at $1530\pm10$ cm$^{-1}$ is a peak of an NH bending vibration which originates from a urethane group, and is an index showing the amount of urethane or urea bonds in the protective layer. The peak at $1410\pm10$ cm$^{-1}$ is a peak originating from the polyester substrate film, and is used as a reference peak when quantitative determination of the intensity is made. When the present bonds are in any one of the above-mentioned ranges, the protective layer is improved in cohesive force by a sufficient hydrogen bonding force between the urethane or urea bonds, so that the laminated film expresses gas barrier performance. If the ratio P1/P2 is less than 1.5, the urethane or urea group amount is small so that the laminated film may not easily gain a satisfactory gas barrier performance. In the meantime, if the ratio is more than 3.5, the gas barrier performance is improved but the film becomes brittle to give disadvantages from the viewpoint of the flexing resistance and the adhesion of the film.

In the present invention, the adhesion amount of the protective layer is set into a range preferably from 0.15 to 0.60 g/m². This case allows to control the protective layer evenly in painting for this layer. As a result, the layer becomes a film little in coat unevenness and defect quantity. Moreover, the protective layer itself is improved in cohesive force to strengthen adhesion between the inorganic thin-film layer and the protective layer, so that the laminated film can be heightened in water resistance. The adhesion amount of the protective layer is preferably 0.17 g/m² or more, more preferably 0.20 g/m² or more, even more preferably 0.23 g/m² or more, and is preferably 0.57 g/m² or less, more preferably 0.54 g/m² or less, even more preferably 0.51 g/m² or less. If the adhesion amount of the protective layer is more than 0.600 g/m², the laminated film is improved in gas barrier performance but the inside of the protective layer is insufficient in cohesive force and is also lowered in evenness so that the external appearance of the coat undergoes unevenness or defects. Thus, after subjected to heat-moisture treatment, the laminated film may not sufficiently exhibit gas barrier performance nor adhesion. In the meantime, if the film thickness of the protective layer is less than 0.15 g/m², the laminated film may not unfavorably gain a sufficient gas barrier performance nor interlayer adhesion.

(Urethane Resin (D))

The urethane resin (D) is obtained by causing a polyisocyanate component (E), which will be detailed below, to react with a polyol component (F), which will be detailed later in a usual way. Furthermore, the resultant may be caused to react with a low molecular weight compound having two or more active hydrogen atoms, such as a diol component (for example, 1,6-hexanediol) or a diamine compound (for example, hexamethylenediamine), as a chain extender. In this way, the chain can also be extended.

(E) Polyisocyanate Component

Examples of the polyisocyanate component (E), which is usable in the synthesis of the urethane resin (D), include aromatic polyisocyanates, alicyclic polyisocyanates, and aliphatic polyisocyanates. As the polyisocyanate compound, a diisocyanate compound is usually used).

Examples of the aromatic diisocyanates include tolylene diisocyanate (2,4- or 2,6-tolylene diisocyanate, or a mixture thereof) (TDI), phenylene diisocyanate (m- or p-phenylene diisocyanate, or a mixtures thereof), 4,4'-diphenyldiisocyanate, 1,5-naphthalene diisocyanate (NDI), diphenylmethane diisocyanate (4,4'-, 2,4'-, or 2,2'-diphenylmethane diisocyanate, or any mixture thereof) (MDI), 4,4'-toluidine diisocyanate (TODI), and 4,4'-diphenyl ether diisocyanate. Examples of the aromatic-aliphaticdiisocyanates include xylylene diisocyanate (1,3- or 1,4-xylylene diisocyanate, or a mixture thereof) (XDI), tetramethylxylylene diisocyanate (1,3- or 1,4-tetramethylxylylene diisocyanate, or a mixture thereof) (TMXDI), and ω,ω'-diisocyanate-1,4-diethylbenzene.

Examples of the alicyclic diisocyanates include 1,3-cyclopentene diisocyanate, cyclohexane diisocyanate (1,4-cyclohexane diisocyanate, and 1,3-cyclohexane diisocyanate), 3-isocyanatomethyl-3,5,5-trimethylcyclohexyl isocyanate (isophorone diisocyanate, IPDI), methylenebis(cyclohexyl isocyanate) (4,4'-, 2,4'- or 2,2'-methylenebis (cyclohexyl isocyanate)) (hydrogenated MDI), methylcyclohexane diisocyanate (methyl-2,4-cyclohexane diisocyanate, and methyl-2,6-cyclohexane diisocyanate), and bis(isocyanatomethyl)cyclohexane (1,3- or 1,4-bis(isocyanatomethyl) cyclohexane or a mixture thereof) (hydrogenated XDI).

Examples of the aliphatic diisocyanates include trimethylene diisocyanate, 1,2-propylene diisocyanate, butylene diisocyanate (tetramethylene diisocyanate, 1,2-butylene diisocyanate, 2,3-butylene diisocyanate, 1,3-butylene diisocyanate), hexamethylene diisocyanate, pentamethylene diisocyanate, 2,4,4- or 2,2,4-trimethylhexamethylene diisocyanate, and 2,6-diisocyanatomethyl caffeate.

(F) Polyol Component

As the polyol component (particularly, the diol component), any component is usable which is selected from a range from glycols of a low molecular weight to oligomers. From the viewpoint of gas barrier performance of the laminated film, any one of the following is usually used: alkylene glycols (such as ethylene glycol, propylene glycol, trimethylene glycol, 1,3-butanediol, 1,4-butanediol, pentanediol, hexanediol, neopentyl glycol, heptanediol, octanediol, and other linear or branched $C_{2-10}$ alkylene glycols); and (poly)oxy $C_{2-4}$ alkylene glycols (such as diethylene glycol, triethylene glycol, tetraethylene glycol, and dipropylene glycol), and other low molecular weight glycols. A preferred glycol component is a $C_{2-8}$ polyol component [for example, a $C_{2-6}$ alkylene glycol (particularly, ethylene glycol, 1,2- or 1,3-propylene glycol, 1,4-butanediol, 1,6-hexanediol, or 3-methyl-1,5-pentanediol)], a di- or trioxy $C_{2-3}$ alkylene glycol (such as diethylene glycol, triethylene glycol, or dipropylene glycol). A particularly preferred diol component is a $C_{2-8}$ alkylene glycol (especially a $C_{2-6}$ alkylene glycol).

These diol components may be used alone or in combination of two or more thereof. As the need arises, a low molecular weight diol component may be together used, examples thereof including aromatic diols (such as bisphenol A, bishydroxyethyl terephthalate, catechol, resorcinol, hydroquinone, and 1,3- or 1,4-xylylenediol; and mixtures thereof); and alicyclic diols (such as hydrogenated bisphenol A, xylylenediol, cyclohexanediol, and cyclohexanedimethanol). Furthermore, as the need arises, a polyol component having a tri- or higher functionality may be together used, examples thereof including glycerin, trimethylolethane, trimethylolpropane, and other polyol components. Such polyol components preferably contain at least a $C_{2-8}$ polyol component (in particular, a $C_{2-6}$ alkylene glycol). The proportion of the $C_{2-8}$ polyol component (in particular, the $C_{2-6}$ alkylene glycol) in the polyol component(s) may be selected from the range of about 50 to 100% by mass of the polyol component(s), the proportion thereof being 100% by mass; and is usually from 70 to 100% by mass, more preferably from 80 to 100% by mass, even more preferably from 90 to 100% by mass.

It is more preferred in the present invention from the viewpoint of the gas barrier performance thereof to use a urethane resin containing, as a main constituent component, an aromatic or aromatic-aliphatic diisocyanate component. It is particularly preferred that the urethane resin contains, out of such diisocyanate components, a m-xylylene diisocyanate component. The use of this resin allows that an effect of stacking between its aromatic rings heightens the cohesive force of the urethane bonds further. Consequently, the laminated film gains a good gas barrier performance. Moreover, polar groups of the urethane bonds interact with the inorganic thin-film layer, and further the urethane resin also has flexibility by the presence of its amorphous portions, so that the inorganic thin-film layer can be restrained from being damaged also when flexing-load is applied to the laminated film.

In the present invention, the proportion of the aromatic or aromatic-aliphatic diisocyanate or such diisocyanates in the urethane resin is set, in the polyisocyanate component (E) or such components (E), to 50% or more by mole (50 to 100% by mole) of the component(s) (E), the proportion thereof being 100% by mole. The total proportion of the aromatic or aromatic-aliphatic diisocyanate(s) is preferably from 60 to 100%, more preferably from 70 to 100%, even more preferably from 80 to 100% by mole. Such resins are preferably "TAKELAC (registered trademark) WPB" series commercially available from Mitsui Chemicals, Inc. If the total proportion of the aromatic or aromatic-aliphatic diisocyanate(s) is less than 50% by mole, the laminated film may not gain a good gas barrier performance.

The urethane resin preferably has a carboxylate group (carboxyl group) from the viewpoint of an improvement of the protective layer in affinity with the inorganic thin-film layer. In order to incorporate a carboxylate (salt) into the urethane resin, it is advisable to introduce thereinto the following, for example, as a polyol component: a polyol compound having a carboxylate group, such as dimethylolpropionic acid or dimethylolbutanoic acid, as a copolymerizable component. Moreover, when a carboxylate-group-containing urethane resin is synthesized and subsequently the reaction system is neutralized with a salt-forming agent, a urethane resin of a water-dispersible product can be gained. Specific examples of the salt-forming agent include ammonia, trimethylamine, triethylamine, triisopropylamine, tri-n-propylamine, tri-n-butylamine, and other trialkylamines; N-methylmorpholine, N-ethylmorpholine, and other N-alkylmorpholines; and N-dimethylethanolamine, N-diethylethanolamine, and other N-dialkylalkanolamines. These compounds may be used alone or in combination of two or more thereof.

(Properties of Urethane Resin)

The acid value of the urethane resin ranges preferably from 10 to 60 mgKOH/g, more preferably from 15 to 55 mgKOH/g, even more preferably from 20 to 50 mgKOH/g. When the acid value of the urethane resin is in any one of these ranges, the resin is improved in liquid stability when made into a water-dispersible liquid. Moreover, the resultant protective layer can be evenly deposited onto the inorganic thin-film layer, which is high in polarity, so that the external appearance of the coat becomes good.

The glass transition temperature (Tg) of the urethane resin in the present invention is preferably 80° C. or higher, more preferably 90° C. or higher. When the Tg is set to 80° C. or higher, a swelling of the protective layer based on molecular movement can be decreased in a heat-moisture treatment process (temperature-raising→temperature-keeping→temperature-lowering).

The laminated film of the present invention has an oxygen permeability of 5 ml/m$^2$·d·MPa or less at 23° C. and 65% RH to express a good gas barrier performance. Furthermore, by controlling the above-mentioned protective layer component/adhesion amount, the oxygen permeability can be set preferably to 4 ml/m$^2$·d·MPa or less, more preferably to 3 ml/m$^2$·d·MPa or less. If the oxygen permeability is 5 ml/m$^2$·d·MPa or more, the laminated film does not easily cope with use thereof for which a high gas barrier performance is required.

According to the above, the laminated film of the present invention is a gas barrier laminated film (laminated body) which is excellent in oxygen barrier performance after subjected to heat-moisture treatment, and has a high interlayer adhesion and an appropriate flexing resistance.

[Other Layers]

In an inorganic-thin-film-layer-including gas barrier laminated film in which the laminated film of the present invention is used, various layers that a known gas barrier laminated film has may be optionally laid besides the above-defined substrate film, coating layer, inorganic thin-film layer and protective layer.

In the case of using the inorganic-thin-film-layer-including gas barrier laminated film as a packaging material, it is preferred to form a heat-sealable resin layer called a sealant. The heat-sealable resin layer is usually laid on the inorganic thin-film layer. However, this resin layer may be laid on the outside of the substrate film (a surface of the laminated film that is opposite to the coating-layer-formed surface thereof). The formation of the heat-sealable resin layer is usually attained by an extrusion laminating method or dry laminating method. A thermoplastic polymer which forms the heat-sealable resin layer is any thermoplastic resin as far as the resin can sufficiently express sealant adhesion. Examples thereof include polyethylene resins such as HDPE, LDPE, and LLDPE, polypropylene resin, ethylene-vinyl acetate copolymer, ethylene-α-olefin random copolymer, and ionomer resin.

Furthermore, in the inorganic-thin-film-layer-including gas barrier laminated film, one or more printed layers, and one or more different plastic substrates and/or paper substrates may be laminated, in a layer form, into between the inorganic thin-film layer or the substrate film, and the heat-sealable resin layer, or onto the outside thereof.

A printing ink for forming the printed layer is preferably a water based or solvent based resin-containing printing ink. Examples of a resin used in the printing ink include acrylic resin, urethane-based resin, polyester-based resin, vinyl chloride-based resin, and vinyl acetate copolymer resin; and an mixture of two or more of these resins. The printing ink may contain known additives, such as antistatic agents, light blocking agents, ultraviolet absorbers, plasticizers, lubricants, fillers, colorants, stabilizers, lubricants, antifoaming agents, crosslinking agents, anti-blocking agents, and antioxidants. The printing method for laying the printed layer is not particularly limited, and a known method may be used, examples thereof including an offset printing method, a gravure printing method, and a screen printing method. The drying of the solvent after the printing may be a known drying method such as hot wind drying, hot roll drying, or infrared drying.

For the different plastic substrate(s) or paper substrate(s), for example, the following are preferably used to give a sufficient rigidity and strength to the laminated body: paper, polyester resin, polyamide resin, and biodegradable resin. In order to produce a film excellent in mechanical strength, it is preferred to use a drawn film, such as a biaxially drawn polyester film or a biaxially drawn nylon film.

In the case of using, particularly as a packaging material, the inorganic-thin-film-layer-including gas barrier laminated film, it is preferred to laminate a nylon film into between the inorganic thin-film layer and the heat-sealable resin layer to improve the film in mechanical properties such as pinhole resistance and piercing strength. The species of the nylon may be usually, for example, nylon 6, nylon 66, or m-xylyleneadipamide. The thickness of the nylon film is usually from 10 to 30 μm, preferably from 15 to 25 μm. If the nylon film is thinner than 10 μm, the film may be unfavorably short in strength. In the meantime, if the thickness is more than 30 μm, the film is large in firmness and flexibility to be unsuitable for being worked. The nylon film is preferably a biaxially drawn film about which the draw ratio in each of the longitudinal and lateral directions is usually 2 or more, preferably from 2.5 to 4.

The laminated film of the present invention also includes embodiments each having one or more of the above-mentioned various layers other than the coating layer and the inorganic thin-film layer.

EXAMPLES

Hereinafter, the present invention will be more specifically described by way of working examples thereof. However, the invention is not limited by the working examples. The working examples may be carried out in the state that an appropriate modification may be applied thereto as far as the modified forms can conform to the subject matters of the invention, which have been described above or will be described later. These modified forms are each included in the technical scope of the invention. Unless otherwise specified, the symbol "%" and the word "part(s)" denote "% by mass" and "part(s) by mass", respectively.

Evaluating methods and physical property measuring methods that were used in each of the working examples and comparative examples are as follows:

(1) Production of Laminated Bodies for Evaluations

By a dry laminating method, an undrawn polypropylene film ("P1147", manufactured by Toyobo Co., Ltd.) as a heat-sealable resin layer, which has a thickness of 70 μm, was bonded onto a protective layer of each of laminated films yielded in each of the working examples and the comparative examples through a urethane based two-liquid-component curable adhesive (in which a product "TAKE-LAC (registered trademark) A525S" manufactured by Mitsui Chemicals, Inc. and a product "TAKENATE (registered trademark) A50" manufactured by the same) were blended with each other at a ratio (by mass) of 13.5/1). The resultant was aged at 40° C. for 4 days. Thus, in each of the examples, laminate-gas-barrier laminated bodies for evaluation (hereinafter referred to also as "laminated bodies") were yielded. The thickness of an adhesive layer made from the urethane based two-liquid-component curable adhesive was set to about 4 μm after the adhesive was dried.

(2) Method for Evaluating Oxygen Permeability

In accordance with an electrolytic sensor method in JIS-K7126-2, an oxygen permeability measuring instrument ("OX-TRAN 2/20", manufactured by MOCON Inc.) was used to measure the oxygen permeability of a simple member that was another laminated film yielded in each of the examples, in a usual state of the film, in an atmosphere of 23° C. temperature, and 65% relative humidity. The measurement of the oxygen permeability was made in a direction in which oxygen permeates the film from the substrate film side thereof, on which no coating layer/protective layer was laminated, to the coating layer/protective layer side thereof.

Separately, one of the laminated bodies produced in each of the examples in the item (1) was subjected to heat-moisture treatment for keeping the laminated body in hot water of 130° C. temperature for 30 minutes, and then dried at 40° C. for 1 day (24 hours). About the resultant laminated body subjected to the heat-moisture treatment, the oxygen permeability thereof was measured (after the body was retorted) in the same way as described above.

(3) Method for Evaluating Laminate Strength

One of the laminated bodies produced in each of the examples in the item (1) was subjected to heat-moisture treatment for keeping the laminated body in hot water of 130° C. temperature for 30 minutes, and was cut out in an undried state into a test piece of 15 mm width and 200 mm length. A Tensilon universal material machine ("TENSILON, UMT-II-500 model", manufactured by Toyo Baldwin Co., Ltd.) was used to measure the laminate strength thereof (after the piece was retorted) at a temperature of 23° C. and a relative humidity of 65%. The laminate strength was defined as the strength of the test piece when the piece was subjected to peeling treatment at a peeling rate of 200 mm/minute and at a peeling angle of 90 degrees in the state that water was given to between the laminated film and the heat-sealable resin layer.

(4) Method for Evaluating Flexing Resistance Barrier Performance

One of the laminated bodies produced in each of the examples in the item (1) was made into a sample piece of 112 inches×8 inches size. The test piece was made into the form of a cylinder having a diameter of 3½ inches, and then fitted to a Gelbo Flex Tester (MIL-B131H, manufactured by Rigaku Hogyo Co., Ltd.). Both ends of the cylinder were held, and then twisted by an angle of 400 degrees at an initial gripping interval of 7 inches and a stroke of 3½ inches. A reciprocation-movement of a repeat of this operation was performed 50 times at 23° C. and a relative humidity of 65% and at a speed of 50 times/minute. About the resultant laminated body after the flexing test, the oxygen permeability (after the flexing treatment) thereof was measured in the same manner as described above.

(5) Method for Measuring Total Infrared Absorption Spectrum of Laminated Film

About the protective layer surface side of another laminated film yielded in each of the working examples and the comparative examples, total reflection absorption infrared spectroscopy was used to measure a total reflection infrared absorption spectrum thereof to gain the intensity (P1) of its peak having an absorption maximum in a range of 1530±10 $cm^{-1}$, and the intensity (P2) of its peak having an absorption maximum in a range of 1410±10 $cm^{-1}$. The ratio between the intensities (ratio P1/P2) was calculated out. The intensity of each of the peaks was calculated out from the peak height of a line through which a base line of an absorbance of zero was perpendicularly linked with the top of the peak.

(Measuring Conditions)

Apparatus: "ALPHA ECO-ATR" manufactured by Bruker Optics Inc.,
  Optical crystal: Ge,
  Incident angle: 45°,
  Resolution power: 8 $cm^{-1}$, and
  Cumulative number: 64.

(5) Method for Measuring Adhesion Amount of Protective Layer

In each of the working examples and the comparative examples, a laminated film yielded at a stage when a protective layer was laminated onto a substrate film was used as a sample. From this sample, a test piece of 100 mm×100 mm size was cut out. The protective layer was wiped off with 1-methoxy-2-propanol or dimethylformamide. From a change in the mass before and after the wiping-off, the adhesion amount of the layer was calculated out.

(6) Oxazoline Group Amount of Resin Having Oxazoline Group

A resin containing an oxazoline group was freeze-dried, and then a $^1$H-NMR spectrum thereof was measured, using a nuclear magnetic resonance analyzer (NMR) GEMINI-200, manufactured by Varian Inc. to gain the intensity of an absorption peak originating from the oxazoline group, and that of each of absorption peaks originating from the other monomers. From these peak intensities, the oxazoline group amount (mmol/g) was calculated out.

(7) Method of Determining Isocyanate Components in Urethane Resin

A sample was dried under reduced pressure, and a $^1$H-NMR spectrum thereof was measured, using a nuclear magnetic resonance analyzer (NMR) GEMINI-200, manufactured by Varian Inc. From the integration ratio between the respective peak intensities originating from individual isocyanate components of the sample, the ratio by mole between the isocyanate components was determined.

In each of the working examples, and the comparative examples, individual materials used in its coating layer and its protective layer were prepared as follows:

<Preparation of Individual Materials Used to Form Coating Layer or Protective Layer>

[Resin (A) Having Oxazoline Group]

As a resin having an oxazoline group, a commercially available water-soluble oxazoline-group-containing acrylate was prepared ("EPOCROS (registered trademark) WS-300", manufactured by Nippon Shokubai Co., Ltd.; solid content: 10%). The oxazoline group amount in this resin was 7.7 mmol/g.

[Acrylic Resin (B)]

As an acrylic resin, a commercially available acrylate copolymer emulsion having a concentration of 25% by mass was prepared ("MOVINYL (registered trademark) 7980", manufactured by Nichigo-Movinyl Co. Ltd.). This acrylic resin (B) had an acid value (theoretical value) of 4 mgKOH/g.

[Urethane Resin (C)]

As a urethane resin for coating layer, a commercially available polyester urethane resin dispersion was prepared ("TAKELAC (registered trademark) W605", manufactured by Mitsui Chemicals, Inc.: solid content: 30%). This urethane resin had an acid value of 25 mgKOH/g, and a glass transition temperature (Tg) of 100° C., which was measured by DSC. The proportion of its aromatic or aromatic-aliphatic diisocyanates was 55% by mole of the whole of its polyisocyanate components, the proportion being measured by $^1$H-NMR.

[Urethane Resin (D)]

As a urethane resin for protective layer, a commercially available m-xylylene-group-containing urethane resin dispersion was prepared ("TAKELAC (registered trademark) WPB341", manufactured by Mitsui Chemicals, Inc.; solid content: 30%). This urethane resin had an acid value of 25 mgKOH/g, and a glass transition temperature (Tg) of 130° C., which was measured by DSC. The proportion of its aromatic or aromatic-aliphatic diisocyanates was 85% by mole of the whole of its polyisocyanate components, the proportion being measured by $^1$H-NMR.

[Gas Barrier Vinyl Alcohol Resin (E)]

As a vinyl alcohol-based resin having gas barrier performance, a commercially available water-soluble vinyl alcohol resin ("Nichigo G-Polymer (registered trademark) OKS-8049", manufactured by The Nippon Synthetic Chemical Industry Co., Ltd.; powder) was dissolved into water to prepare an aqueous solution thereof having a solid content of 5%.

Example 1

(1) Preparation of Coating Liquid 1 Used in Coating Layer

Individual materials each having a blend proportion described below were mixed with each other to produce a coating liquid (resin composition for coating layer). In the resultant coating liquid, the ratio by mass between the oxazoline-group-having resin (A), the acrylic resin (B) and the urethane resin (C), this ratio being a ratio in terms of solid contents in the liquid, was as shown in Table 1.

Water: 54.40%,
Isopropanol: 25.00%,
Oxazoline-group-containing resin (A): 15.00%,
Acrylic resin (B): 3.60%, and
Urethane resin (C): 2.00%.

(2) Preparation of Coating Liquid 2 Used in Coating of Protective Layer

Coating agents described below were mixed with each other to produce a coating liquid 2. The proportion by mass of the urethane resin (D), this proportion being a proportion in terms of a solid content in the coating liquid, was as shown in Table 1.

Water: 60.00%,
Isopropanol: 30.00%, and
Urethane resin (D): 10.00%.

(3) Production of Polyester Substrate Film, and Coating with Coating Liquid 1 (Lamination of Coating Layer)

A polyethylene terephthalate resin having an intrinsic viscosity of 0.62 dl/g (at 30° C.; phenol/tetrachloroethane=60/40) was preliminarily crystallized, and then regularly dried. An extruder having a T die was used to extrude the resin at 280° C., and then rapidly cool and solidify the extruded resin on a drum having a surface temperature of 40° C. to yield an amorphous sheet. Next, the resultant sheet was drawn between a heating roll and a cooling roll at 100° C. and a draw ratio of 4.0 into the longitudinal direction thereof. A single surface of the resultant uniaxially drawn film was coated with the coating liquid 1 by a fountain bar coating method. While dried, the film was introduced into a tenter, pre-heated at 100° C., and drawn at 120° C. and a draw ratio of 4.0 into the lateral direction. While relaxed by 6% in the lateral direction, the film was thermally heated at 225° C. to yield a laminated film on which a coating layer having an adhesion amount of 0.020 g/m$^2$ was formed onto the resultant biaxially drawn polyester film of 12 μm thickness.

(4) Formation (Vapor Deposition) of Inorganic Thin-Film Layer

Next, by an electron beam vapor deposition method, an inorganic complex oxide layer made of silicon dioxide and aluminum oxide was formed, as an inorganic thin-film layer, onto the coating layer surface of the laminated film yielded in the item (2). A used vapor deposition source was SiO$_2$ (purity: 99.9%) and Al$_2$O$_3$ (purity: 99.9%) in the form of particles having a size of about 3 to 5 mm. The composition of the complex oxide layer was as follows: SiO$_2$/Al$_2$O$_3$ (ratio by mass)=60/40. The film thickness of the inorganic thin-film layer (SiO$_2$/Al$_2$O$_3$ complex oxide layer) was 13 nm.

(5) Coating with Coating Liquid 2 Onto Vapor Deposited Film (Lamination of Protective Layer)

The upper of the inorganic thin-film layer of the vapor deposited film yielded in the item (4) was coated with the coating liquid 2, and this workpiece was dried at 200° C. for 15 seconds to yield a protective layer. The coat amount of the layer after the drying was 0.190 g/m$^2$ (dry).

As described above, each laminated film was produced in which the coating layer/the metal oxide layer/the protective layer were formed on the substrate film. About the resultant laminated film, the oxygen permeability and the laminate strength were evaluated as described above. The results are shown in Table 2.

Examples 2 to 4, and Comparative Examples 1 to 6

In each of the examples, each laminated film was produced in the same way as in Example 1 except that: in the preparation of the coating liquid for forming the coating layer, the individual materials were changed to set the ratio by mass between the oxazoline-group-containing resin (A), the acrylic resin (B) and the urethane resin (C), this ratio being a ratio in terms of solid contents in the coating liquid, as shown in Table 1 (at this time, the proportion of isopropanol in the whole of the coating liquid was set to 25.00% by mass of the whole in the same manner as in Example 1); or in the preparation of the coating liquid for forming the protective layer, the adhesion amount and/or the species of the resin was/were changed as shown in Table 1 (at this time, the proportion of isopropanol in the whole of the coating liquid was set to 30.00% by mass of the whole in the same manner as in Example 1). The oxygen permeability and the laminate intensity thereof were evaluated. The results are shown in Table 2.

excellent in gas barrier performance and simultaneously excellent in adhesion, of course, in the state that the film is kept in an ordinary state, and also after the film is subjected to heat-moisture treatment. This gas barrier laminated film has advantages of being easily produced, being excellent in economy and production stability, and gaining even properties easily. Accordingly, this gas barrier laminated film is widely usable not only for food packaging for heat-moisture treatment, but also for the packaging of various foods, medicines, industrial products and other products, and for industrial articles such as solar batteries, electronic paper, organic EL elements, semiconductor elements, and others.

TABLE 1

| | Coating layer | | | | Protective Layer | | | | | |
|---|---|---|---|---|---|---|---|---|---|---|
| | Oxazoline-group-containing resin | Acrylic resin | Urethane resin | A/B/C [ratio by mass] | Polyurethane resin | Polyvinyl alcohol resin | Adhesion amount [g/m$^2$] | IR strength | | |
| | | | | | | | | P1 | P2 | P1/P2 |
| Example 1 | (A) | (B) | (C) | 50/30/20 | (D) | — | 0.19 | 0.039 | 0.022 | 1.77 |
| Example 2 | (A) | (B) | (C) | 50/30/20 | (D) | — | 0.38 | 0.051 | 0.02 | 2.55 |
| Example 3 | (A) | (B) | (C) | 50/30/20 | (D) | — | 0.56 | 0.064 | 0.02 | 3.20 |
| Example 4 | (A) | — | — | 100/0/0 | (D) | — | 0.20 | 0.038 | 0.022 | 1.73 |
| Comparative Example 1 | (A) | (B) | (C) | 50/30/20 | (D) | — | 0.04 | 0.011 | 0.024 | 0.46 |
| Comparative Example 2 | (A) | (B) | (C) | 50/30/20 | (C) | — | 0.38 | 0.021 | 0.021 | 1.00 |
| Comparative Example 3 | (A) | (B) | (C) | 50/30/20 | — | (E) | 0.38 | 0 | 0.027 | 0.00 |
| Comparative Example 4 | (A) | (B) | (C) | 50/30/20 | — | — | — | 0 | 0.027 | 0.00 |
| Comparative Example 5 | — | — | (C) | 0/0/100 | (D) | — | 0.20 | 0.037 | 0.02 | 1.85 |
| Comparative Example 6 | — | — | — | — | (D) | — | 0.38 | 0.061 | 0.023 | 2.65 |

TABLE 2

| | Evaluating items | | | | |
|---|---|---|---|---|---|
| | Oxygen permeability [ml/m$^2$ · day · MPa] | | | Laminate strength [N/15 mm] | |
| | Before treatment | After retorting | After gelbo treatment | Before treatment | After retorting |
| Example 1 | 2.4 | 3.0 | 41.1 | 4.1 | 3.0 |
| Example 2 | 2.3 | 2.9 | 39.3 | 4.4 | 3.2 |
| Example 3 | 1.4 | 1.4 | 40.2 | 4.6 | 2.4 |
| Example 4 | 2.0 | 3.2 | 48.3 | 3.7 | 3.0 |
| Comparative Example 1 | 5.7 | 6.8 | 46.7 | 1.7 | 2.6 |
| Comparative Example 2 | 9.1 | 9.2 | 67.4 | 3.9 | 1.0 |
| Comparative Example 3 | 1.0 | 3.5 | 3.1 | 2.6 | 0.0 |
| Comparative Example 4 | 9.5 | 9.4 | 63.3 | 4.0 | 3.4 |
| Comparative Example 5 | 2.8 | 23.9 | 52.3 | 0.5 | 0.8 |
| Comparative Example 6 | 2.3 | 9.6 | 85.0 | 4.2 | 2.4 |

INDUSTRIAL APPLICABILITY

The present invention allows to provide a gas barrier laminated film which has an inorganic thin-film layer, and is

The invention claimed is:
1. A laminated film comprising a polyester substrate film, and a coating layer on/over at least one surface of the polyester substrate film;
   the coating layer comprising a resin composition comprising, as a constituent component, a resin having an oxazoline group;
   the laminated film comprising (a) an inorganic thin-film layer on/over the coating layer, and (b) a protective layer consisting of a urethane resin and has an adhesion amount of 0.15 to 0.60 g/m$^2$ on/over the inorganic thin-film layer;
   the laminated film showing a total reflection infrared absorption spectrum having a ratio P1/P2 ranging from 1.5 to 3.5 wherein P1 is an intensity of a peak having an absorption maximum in a range of 1530±10 cm$^{-1}$, and P2 is an intensity of a peak having an absorption maximum in a range of 1410±10 cm$^{-1}$; and
   the laminated film having an oxygen permeability of 2.4 ml/m$^2$·d·MPa or less under conditions of a temperature of 23° C. and a relative humidity of 65%.
2. The laminated film according to claim 1, wherein the urethane resin in the protective layer comprises an aromatic or aromatic-aliphatic component.
3. The laminated film according to claim 2, wherein the urethane resin in the protective layer comprises a m-xylylene component.
4. The laminated film according to claim 3, wherein the oxazoline-group-containing resin in the resin composition for coating layer contains an oxazoline group amount of 5.1 to 9.0 mmol/g.

5. The laminated film according to claim 4, wherein the coating layer comprises therein an acrylic resin having an acid value of 10 mgKOH/g or less.

6. The laminated film according to claim 5, wherein the inorganic thin-film layer is a layer of a complex oxide of silicon oxide and aluminum oxide.

7. The laminated film according to claim 1, wherein the urethane resin in the protective layer comprises a m-xylene component.

8. The laminated film according to claim 1, wherein the oxazoline-group-containing resin in the resin composition for coating layer contains an oxazoline group amount of 5.1 to 9.0 mmol/g.

9. The laminated film according to claim 1, wherein the coating layer comprises therein an acrylic resin having an acid value of 10 mgKOH/g or less.

10. The laminated film according to claim 1, wherein the inorganic thin-film layer is a layer of a complex oxide of silicon oxide and aluminum oxide.

\* \* \* \* \*